United States Patent [19]
Luck et al.

[11] 4,389,757
[45] Jun. 28, 1983

[54] CONTROL LEVER SEAL

[75] Inventors: Karl-Heinz Luck, Dusseldorf; Albert Kallenberg, Hurth; Manfred Schnippering, Pulheim; Herbert Moeselaken, Grevenbroich, all of Fed. Rep. of Germany

[73] Assignee: International Harvester Co., Chicago, Ill.

[21] Appl. No.: 265,137

[22] Filed: May 20, 1981

Related U.S. Application Data

[63] Continuation of Ser. No. 11,332, Feb. 12, 1979, abandoned.

[30] Foreign Application Priority Data

Feb. 23, 1978 [DE] Fed. Rep. of Germany ....... 2807819

[51] Int. Cl.³ ............................................. A44B 19/26
[52] U.S. Cl. .............................. 24/205.1 R; 180/90.6; 24/205.15 R; 24/205 R
[58] Field of Search ............... 24/205.15 R, 205 R, 24/205.1 R; 74/566; 180/90.6

[56] References Cited

U.S. PATENT DOCUMENTS

| 1,104,370 | 7/1914 | McCormick | 180/90.6 |
| 1,679,498 | 8/1928 | Richardson | 180/90.6 |
| 1,728,306 | 9/1929 | Richardson | 180/90.6 |
| 2,392,685 | 1/1946 | Morin | 24/205.15 R X |
| 2,557,827 | 6/1951 | Krupp | 24/205.1 R |
| 3,026,589 | 3/1962 | Sperry et al. | 24/205.1 R |
| 3,095,908 | 7/1963 | Plummer | 24/205.1 R X |
| 3,748,923 | 7/1973 | Babbitt, Jr. et al. | 74/566 |
| 4,027,361 | 6/1977 | Yoneya | 24/205 R |

FOREIGN PATENT DOCUMENTS

| 667061 | 11/1935 | Fed. Rep. of Germany | 24/205.15 R |
| 954343 | 4/1964 | United Kingdom | 24/205.15 R |

Primary Examiner—James T. McCall
Assistant Examiner—Peter A. Aschenbrenner
Attorney, Agent, or Firm—John W. Gaines; F. David AuBuchon

[57] ABSTRACT

Device to seal slot-shaped openings provided for the passing-through of operating levers which are supported in a pivoting manner on one plane and are either actuated by hand or by foot and which features sealing elements, one of them assigned to each opening.

1 Claim, 12 Drawing Figures

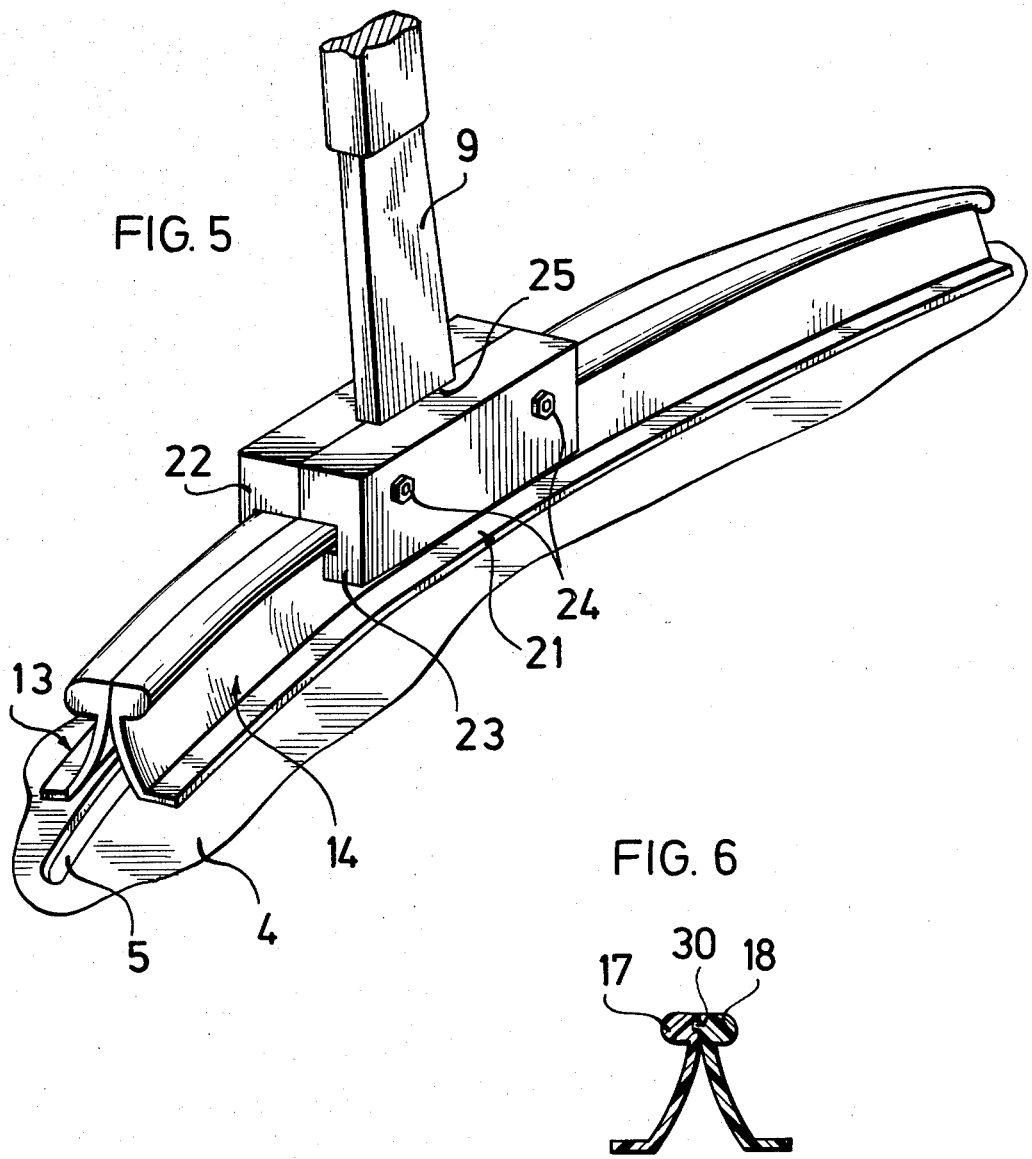

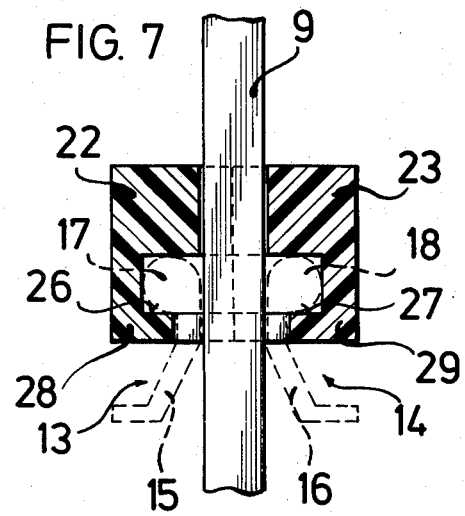
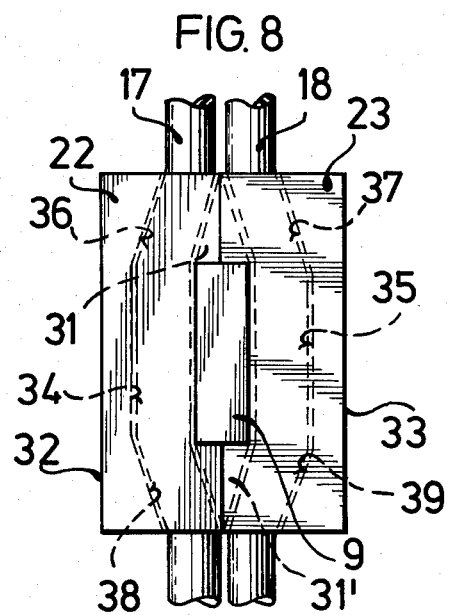
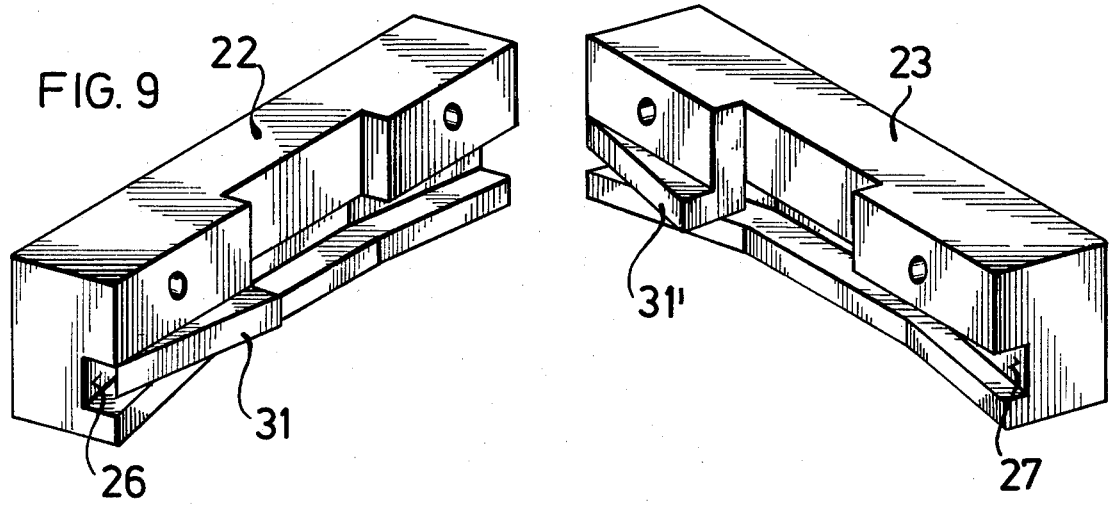

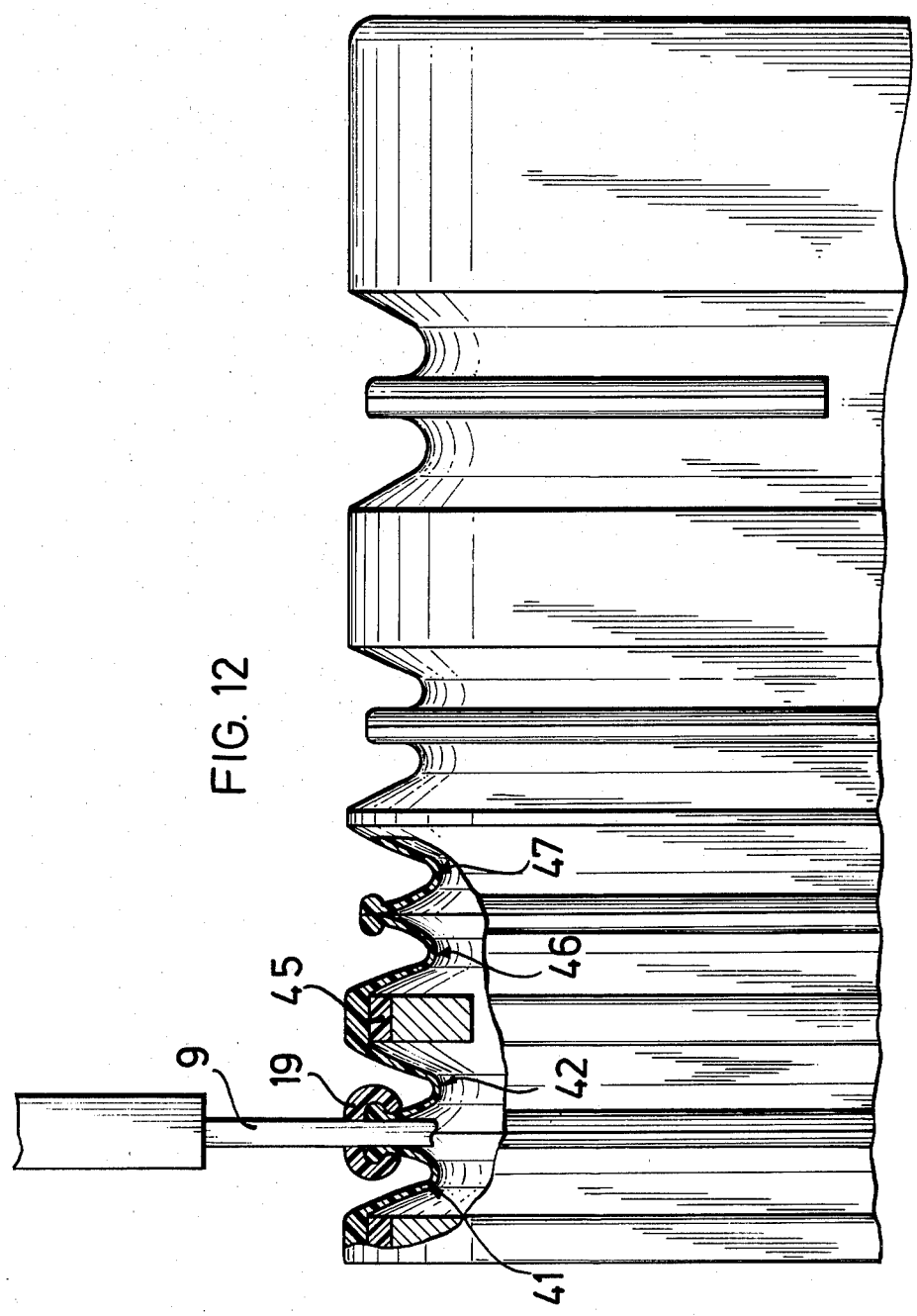

CONTROL LEVER SEAL

This is a continuation of application Ser. No. 11,332, filed Feb. 12, 1979 now abandoned.

BACKGROUND OF THE INVENTION

The invention refers to a device provided to seal slot-shaped openings for the passing-through of operating levers which are supported in a pivoting manner on one plane and are either actuated by hand or by foot and which features sealing elements, one of them assigned to each opening. The individual sealing element features sealing lips which extend along the opening, which are closely arranged side by side, and which are made of flexible material.

A device of the above-mentioned kind became known by the German DOS No. 2328 952. In the case of this known device several sealing lips are arranged at a distance one beneath the other, whereby between the adjacent sealing lips clearances of groove-type design are located, which are provided to accommodate a sound-absorbing material. In a preferred embodiment of the known device the facing sealing lips of the two sealing elements can feature a meshing toothing. The expenditure to manufacture this known sealing device is comparatively high, since a complete sound-absorbing kit must be produced for which the required installation space, e.g. in a vehicle, must be provided. Furthermore, despite of the soft-rubber-type sealing lips one is still confronted by the disadvantage that directly in front of and behind the operating levers and between the sealing lips a slot remains open, which is mainly of triangular shape, and through which a noise emission is possible. Furthermore, this also applies to the total length of the opening if in course of time the sealing lips are worn or bulged.

The invention is based on the objective of providing a device of the initially mentioned kind which serves to close the slot-shaped openings. By its uncomplicated and reasonable design subject device renders possible an easy adjusting of the operating lever in said opening, however, it largely seals these openings against noise emission. According to the invention this problem is solved thereby that the sealing lips feature reinforced rims at their free ends, which are encased according to the zip-type principle by a closing element arranged in the vicinity of the operating lever. According to the invention an uncomplicated and space-saving device is achieved which is easy to operate, however, by means of which the slot-type openings can be kept closed. Due to the specific arrangement of the closing element and by interaction with said rims it is possible to open same so that the operating lever can be shifted into any desired position within the opening without any particular efforts. Therefore, in the case of an embodiment according to the invention a device is obtained on which the opening is opened and closed simultaneously so that a so far unknown excellent method of sealing is obtained.

In an expedient embodiment of the invention the closing element is of C-shaped cross section. By this embodiment a particularly simple design is achieved which renders it possible to encircle the rims of the sealing lips.

Furthermore, it is of advantage if the closing element in its center section features a guide opening for the passing-through of the operating lever. In the case of such an embodiment the operating lever is centrally arranged in the closing element and in this case it is easy to lead said sealing element on arch-type or curve-type extending rims or sealing lips respectively, whereby the operating lever performs a relative movement inside the guide opening.

The closing element can be manufactured of one piece and can feature a bulgy center section. Such a design renders possible that the sealing element can be guided on rims, which extend either along a straight line or along a large curve.

The closing element can also be made of two identical sections, whereby each section preferably features a longitudinal groove, serving to accommodate the pertinent rims of the sealing lips. The two sections can be connected in a suitable manner, e.g. can be bolted to each other.

The opening and closing of the rims can be achieved particularly easily if the longitudinal grooves in the vicinity of the guide opening, provided for the operating lever, feature a center section, mainly extending parallel to the outer face of the section, which runs in longitudinal direction, and if they feature two end sections which are adjacent to said center section and run towards each other in direction of the front face.

In order to close the air passages located directly at the operating lever a further feature of the invention provides means according to which the sections represent in the individual end section a mainly triangular-shaped wedge-type member which at least extends into the longitudinal grooves of the other sections. This design closes in a comparatively uncomplicated way the possibly still remaining openings of triangular cross-section by the wedges provided on said sections. A closing element of such design can also be used in the case of increasingly bent, slot-type openings, e.g. tangent from a straight line and changing into a radiant. In this case it makes no difference if the center of the curvature of the slot-type openings is not identical with the center of rotation of the operating lever. In each case, thus in both, neutral position and adjusted operating lever, any escaping of air-borne sound is largely prevented by the triangular-shaped wedges.

SUMMARY OF THE INVENTION

Device to seal slot-shaped openings provided for the passing-through of operating levers which are supported in a pivoting manner on one plane and are either actuated by hand or by foot and which features sealing elements, one of them assigned to each opening.

BRIEF DESCRIPTION OF THE DRAWINGS

Preferred embodiments of the invention are displayed in the drawings and are explained in the following:

FIG. 5 shows a further embodiment of the sealing device featuring a modified closing element;

FIG. 6 shows a slightly modified embodiment;

FIG. 7 shows a vertical section through the sealing device shown in FIG. 5;

FIG. 8 shows the appertaining top view;

FIG. 9 shows sections of the closing element shown in FIG. 5 in a perspective and exploded view;

FIG. 12 shows an arrangement of several sealing devices, arranged side by side, of the design shown in FIGS. 10 and 11.

DETAILED DESCRIPTION OF THE PREFERRED EMBODIMENT

Figure 1:
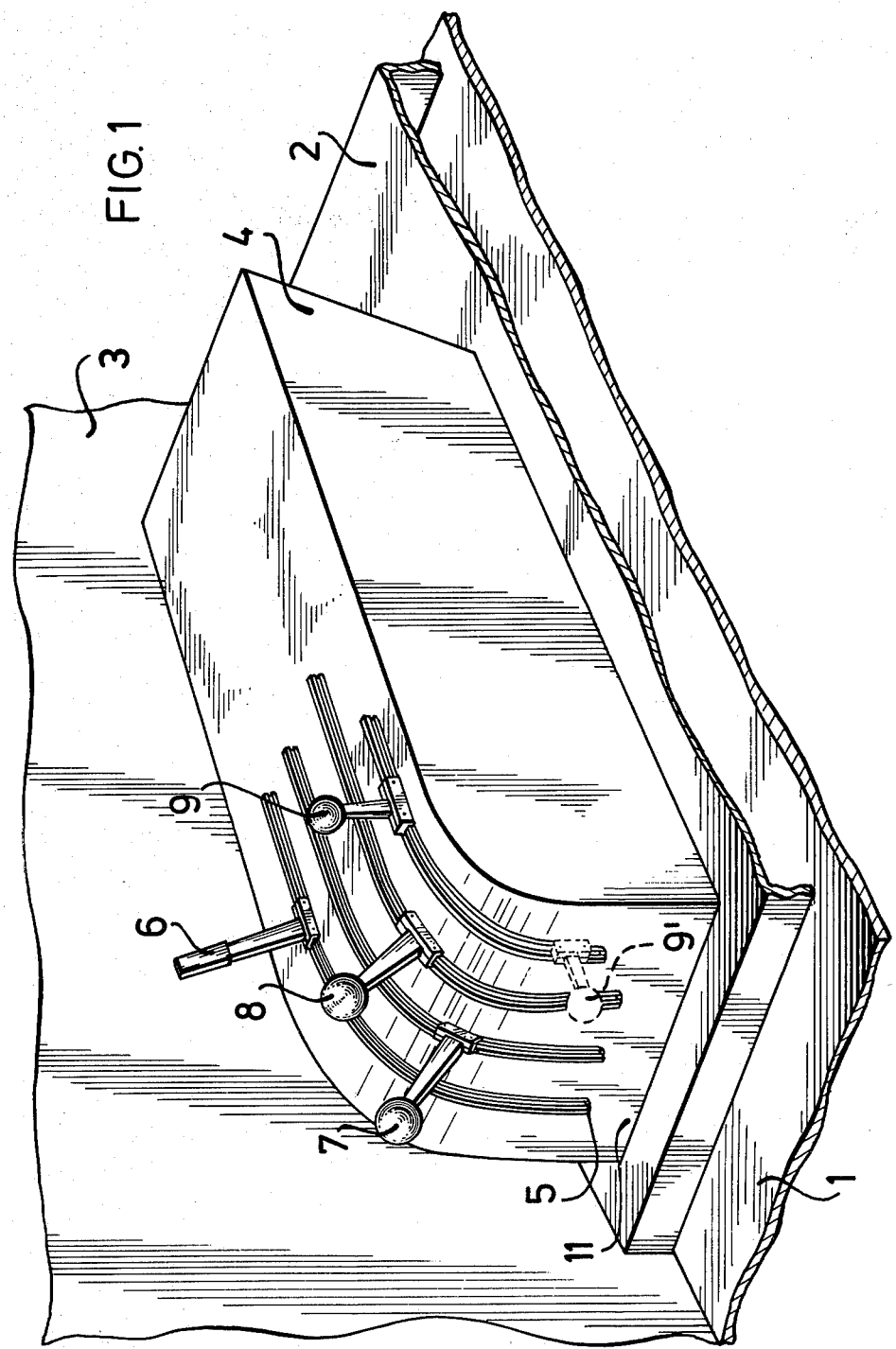
FIG. 1 shows a section of a platform on a farm tractor in perspective presentation.

In FIG. 1 the platform of a vehicle not displayed in detail (e.g. a farm tractor) is assigned the reference mark 1. On the platform 1 a floor plate 2 as well as a lateral wheel guard 3 are provided. On the floor plate 2 a mainly rectangular control box 4 is arranged which is rounded off at one side and which features several slot-type openings 5, arranged therein, through which the operating levers 6, 7, 8, 9 can be adjusted. The supporting shaft (not shown) of the individual operating levers 6 through 9 is locating—relative to the front face 11 of the control box 4 at a lower level and behind a center point which is assigned to the radiant section of the guide slots 5. Therefrom it results that, for example, when the operating lever 9 is actuated forward in direction of the front face 11, the operating lever 9 takes up the dotted position 9'. Due to the different positioning of the swivel shaft for the operating lever on the one hand and the center point for the radiant of the slot-shaped openings 5 on the other hand, it is comparatively difficult to close the openings 5 in the control box 4 against air-borne sound.

Figure 2:
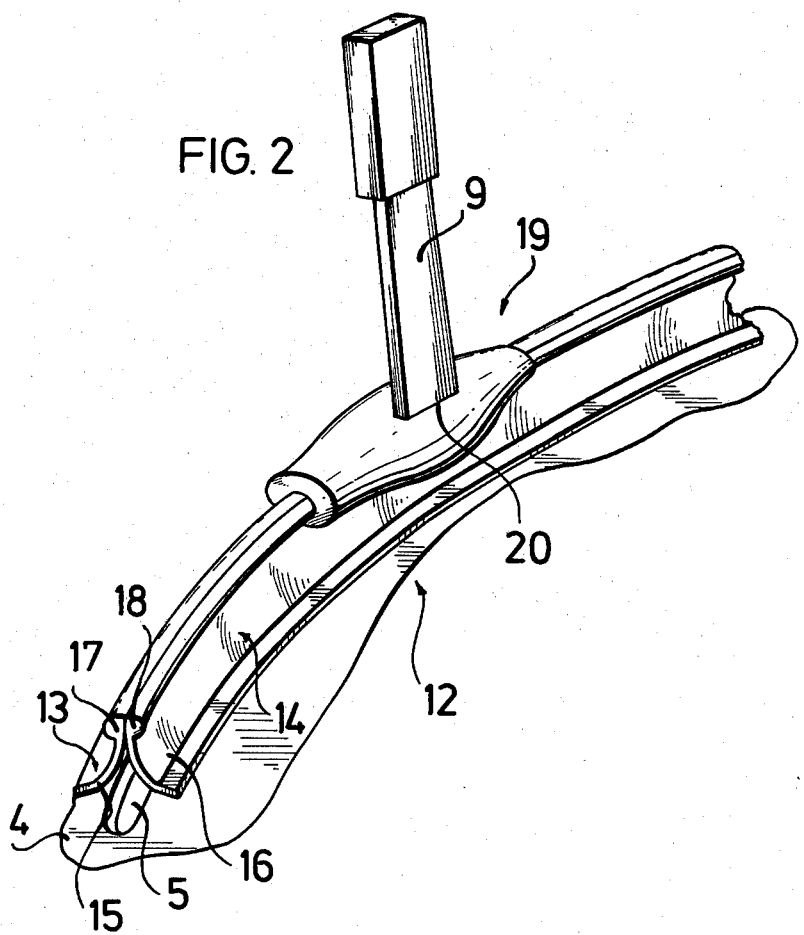
FIG. 2 shows a section of the sealing device in a first embodiment.
Figure 3:
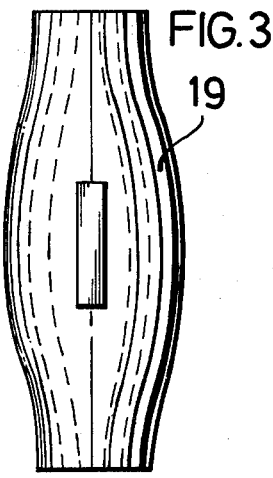
FIG. 3 shows a top view of the closing element of the sealing device.
Figure 4:
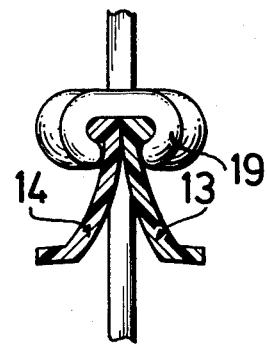
FIG. 4 shows a cross-section through the closing element.

According to the invention it is now intended to arrange one each sealing element 12 at either side of the openings 5 as it is for example shown in FIGS. 2 through 4. Such a sealing element 12 consists of sealing lips 13, 14 located at either side of the opening 5 which in turn consist of collar-type members 15, 16 which are mounted to the control box 4, e.g. by gluing, by riveting or similar ways of mounting, and which feature rims 17, 18 arranged at their free ends. The sealing lips 13, 14 consist of synthetic coautchouc and are flexible in such a way that they normally rest against each other, as displayed in FIG. 2. If now the operating lever 9 is to be moved along the opening 5 in order to adjust a corresponding unit within the vehicle, the operating lever 9 must be shifted to a new position. At the same time it must be guaranteed that no escape of air-borne sound is possible. This is achieved thereby that a closing element 19 is provided in the vicinity of the operating lever 9, whereby said closing element 19 is made of one piece in the embodiment shown in FIGS. 2 through 4 and is of bulgy design in its center section. The center section has a guide opening 20 through which passes the control lever 9. Seen from cross-sectional view the closing element 19 is of C-shaped design, i.e. in such a manner that the rims of the sealing lips 17, 18 are embraced. The entire device operates according to the zip-type principle, i.e. seen in direction of adjusting the sealing lips are opened and are directly closed on the other side; thus any escape of air-borne sound is prevented. It stands to reason that an identical sealing device is provided for the operating levers 6, 7 and 8.

In the case of the sealing device shown in FIG. 5 the sealing lips 13, 14 are of identical design, however, in this case another closing element 21 is provided. Said closing element 21 consists of two sections 22, 23, mainly of identical or symmetrical design, which are bolted to each other by means of bolts 24. In the middle between the two sections 22, 23 a guide opening 25 is provided for the passing-through of the operating lever 9.

As shown in the FIGS. 7 and 8 longitudinal grooves 26, 27 are provided in the sections 22, 23 in which the rims 17, 18 of the sealing lips 13, 14 are accommodated. In the lower area of the sections 22, 23, i.e. below the longitudinal grooves 26, 27 there are collar-type end sections 28, 29, bent in inward direction which, relative to the thickness of the operating lever 9, are designed in a way that the collar-type members 15, 16 of the sealing lips 13, 14 can be guided through in between.

As shown in FIG. 8 normally directly in front of and behind the operating lever 9 a triangular opening would remain open through which sound could escape. To prevent an escaping of sound in this area, too, triangular-shaped wedges 31, 32 are located close to the ends of the sections 22, 23. Said wedges will be explained later on in detail. Furthermore, FIG. 8 shows that the longitudinal grooves 26, 27 feature a center section 34, 35, parallel extending to the outer face 32, 33 of the sections 22, 23, and that they feature end sections 36, 37 or 38, 39 respectively which extend towards each other in direction of the front faces; thus the course of the rims 17, 18 displayed in FIG. 8 is achieved.

As mentioned above in the sections 23, 24 and close to the ends triangular wedges 31, 32 are located (shown in more detail in FIG. 9). By these wedges any escape of air-borne sound directly in front of and behind the operating lever 9 is largely prevented.

Figure 10:
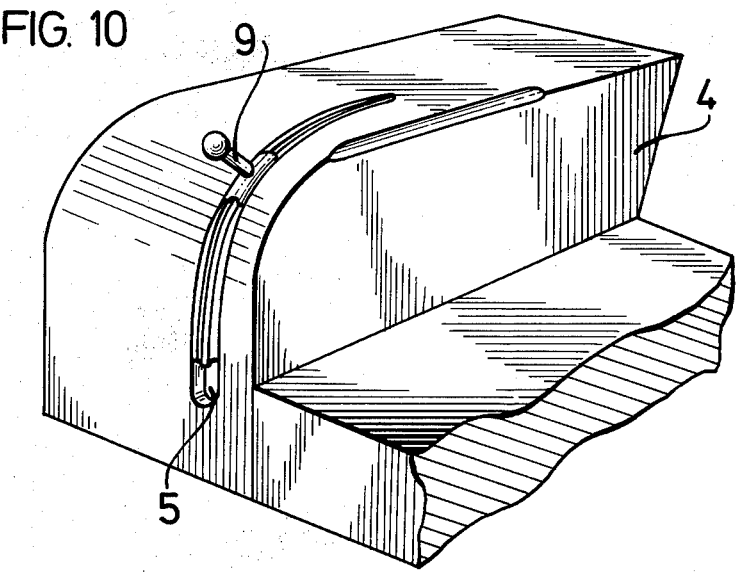
FIG. 10 shows a further embodiment of a sealing device inside an operator's platform of a motor vehicle.
Figure 11:
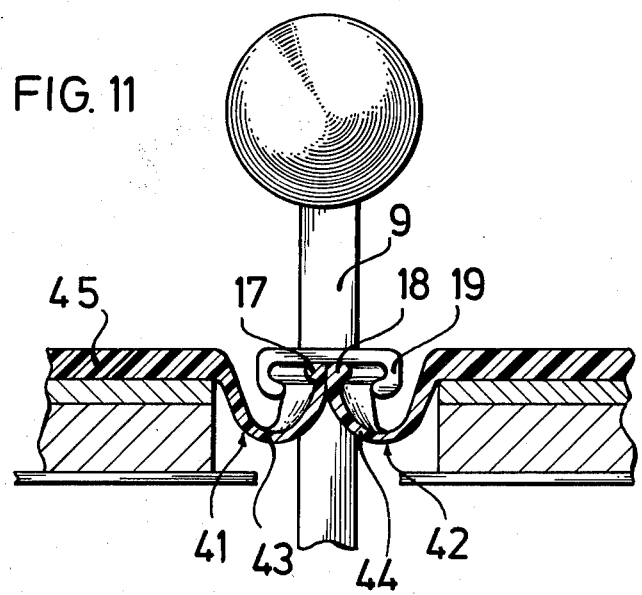
FIG. 11 shows the corresponding individual view of the sealing device in an enlarged scale.

It is typical for the embodiment shown in the FIGS. 10 and 11 that the sealing lips 41, 42 are designed in another way, i.e. their extensions 43, 44 are of arch-type design, bent in upward direction, and are arranged at a level lower than that of the rims 17, 18.

Furthermore, the extensions 43, 44 are mounted to a floor mat 45 in a way that the extensions 43, 44 form one piece with the floor mat 45. It is also typical for the sealing device shown there that the rims 17, 18 are arranged at a lever lower than that of the floor mat 45. This is advantageous since the closing element 19 with its top side flushes with the top side of the floor mat 45. In other words, as shown in FIG. 10, the entire adjusting mechanism is located within the slot-shaped opening 5, so that there are no undesirable projections.

FIG. 12 shows an arrangement where the operating lever 9 together with the closing element 19 and the downward-bent sealing lips 41, 42 represent an embodiment which is in direct connection with the floor mat 45.

Further sealing lips 46, 47 are arranged adjacent to the sealing lips 41, 42. The same applies to further sealing lips not marked in detail.

A slight modification is shown in FIG. 6. Here, the rims 17, 18 are meshing via a spring-groove connection 30. By this an improved connection of the two rims 17, 18 is obtained.

Furthermore, it has proved advantageous if the sealing element is made of polytetrafluor ethylene and if the sealing lips are made of synthetic caoutchouc. With these materials a comparatively low friction coefficient is achieved.

What is claimed is:

1. In a device to seal a surface penetrated by a pivoted operating lever having a substantially constant cross-section along its length, which lever extends through a slot in the surface, a pair of sealing elements of flexible material secured to said surface, one on each side of said slot and normally engaging to seal said slot, and rims formed on said sealing elements; an improved closing element comprising:
- a pair of mating sections;
- a longitudinal rim groove formed in each section to accept said rims;
- a lever groove in each section transverse to said rim groove and having a shape and size which is complementary to and slidingly engageable with said lever when said sections are connected around said lever;
- said rim groove in each section angling toward the other section on each side of said lever groove;
- a wedge formed on opposite ends of each section and positioned to protrude into the rim groove on the other section; and
- releasable fastening means for connecting said sections around said lever whereby the rims are operated and closed around said lever, as it is pivoted, within said closing element, while allowing minimal contact with said lever.

* * * * *